United States Patent Office 3,010,739
Patented Nov. 28, 1961

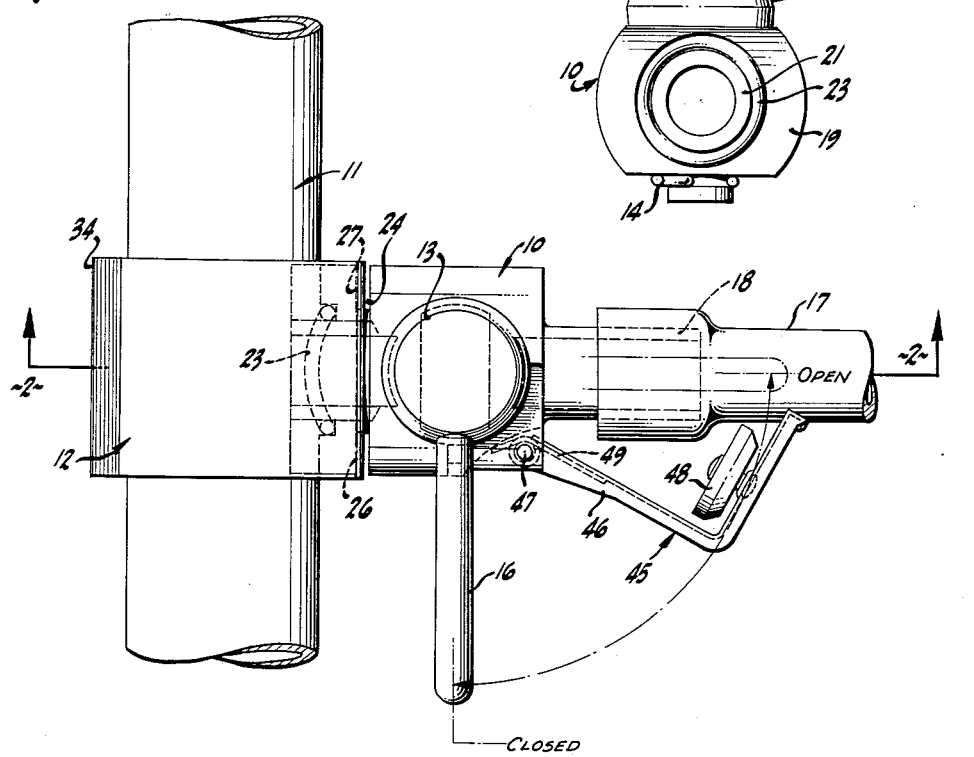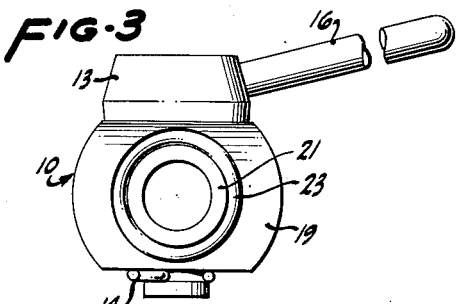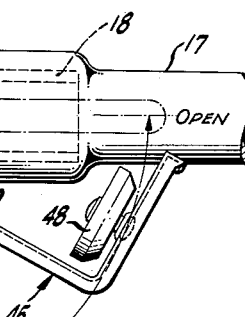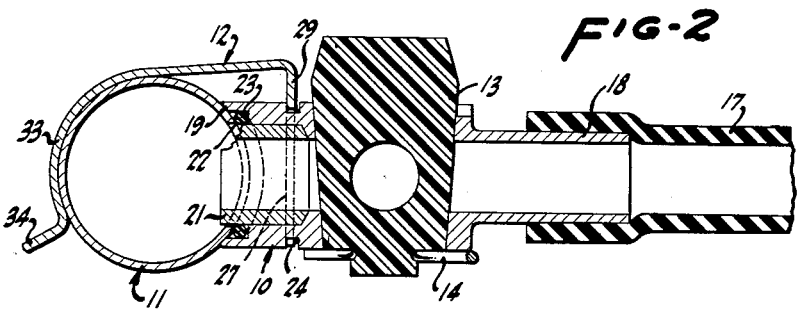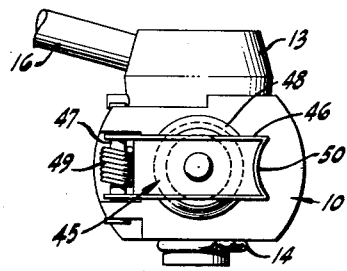

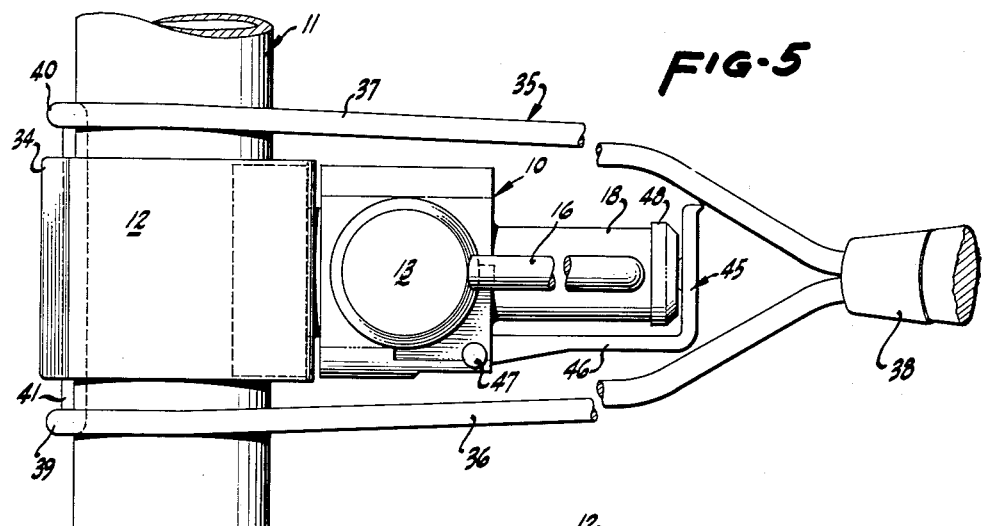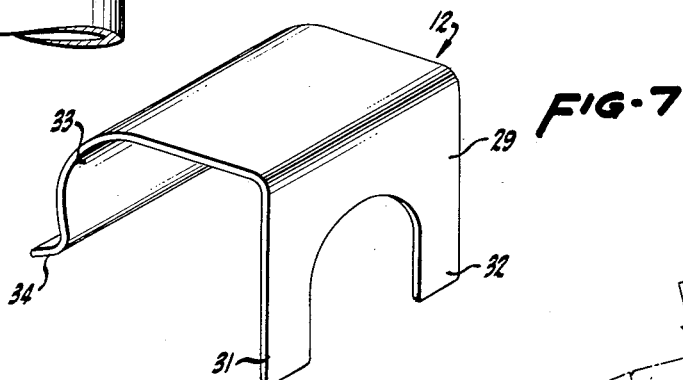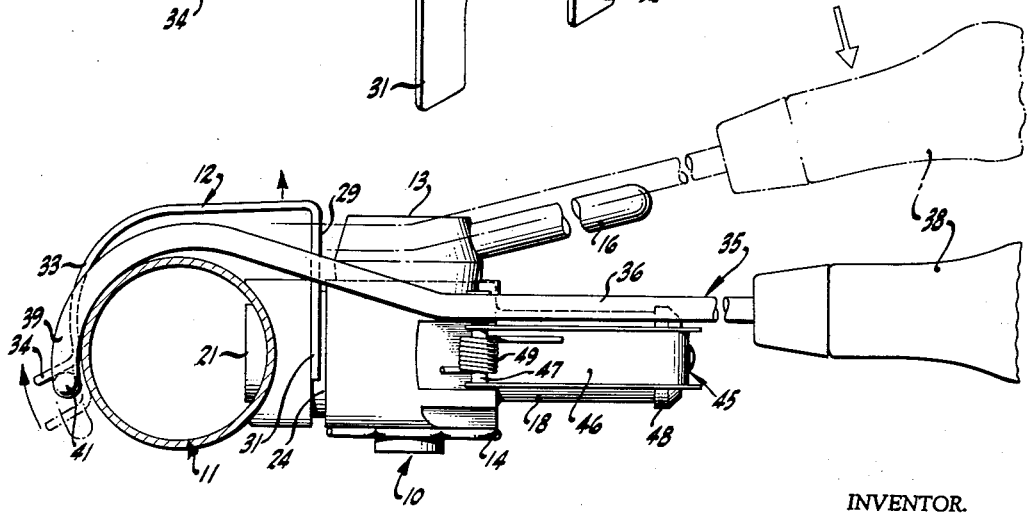

3,010,739
COUPLING MEANS FOR REMOVABLE VALVES OF MILKING SYSTEMS
Archie E. Boudreau, P.O. Box 1125, Modesto, Calif.
Filed June 2, 1958, Ser. No. 739,032
3 Claims. (Cl. 285—197)

This invention relates to means for removably mounting valve bodies on a tubular manifold having side wall openings therethrough.

It is becoming increasingly common in dairy operations to milk many cows simultaneously by the use of vacuum operated milking machines. These machines are each connected by valve connections to a common manifold, and the milk drawn from each cow flows through the manifold into a suitable milk receiving tank maintained at a sub-atmospheric pressure. After the milking operations have been completed, washing and sanitizing solutions are flushed under pressure back through the system to clean and sterilize the system.

The various dairy codes and regulations are quite strict as to the apparatus involved, and generally require that the manifold be made of stainless steel tubing. In addition, the codes often require that if the manifold is over a stated maximum length, the individual valve connections thereto must be made removable therefrom. Because of these requirements, much trouble has been encountered in providing a suitable, satisfactory connection between the valves and the manifold.

The manifold, being of stainless steel tubing, is a difficult material to work, and standard pipe connections thereto are expensive. The most practicable solution has been to provide openings through the side wall of the manifold tube, one such opening being provided for each stall. Of course, the thinness of the tube wall precludes the use of a threaded fitting thereto, and various clamping devices have been proposed to press a valve body tightly against the manifold openings so as to seal therebetween. It has been found, however, that these proposed devices either do not hold the valves tightly enough against the manifold so as to seal therebetween, or else the clamping device is so cumbersome that the valve may not be easily removed from the manifold when required.

It is necessary in such connections, when in use for milking, that they be sealed so that no air can enter the system, as air will cause contamination and oxidation of the milk. Also, the connection must be sufficiently strong so that when back flushing operations are carried out, the valve connection will not be blown off of the manifold.

It is the principal object of this invention to provide a valve connection to a tubular manifold which will maintain the valve tightly against the manifold and which will enable the valve to be easily removed therefrom when required.

Other objects and advantages will become apparent in the course of the following detailed description.

In the drawings, forming a part of this application, and in which like parts are designated by like reference numerals throughout the same, FIG. 1 is a plan view of a valve body clamped to a tubular manifold in accordance with the invention.

FIG. 2 is a sectional view, taken on line 2—2 of FIG. 1.

FIG. 3 is a front elevational view of the valve body of FIG. 1.

FIG. 4 is a rear elevational view of the valve body of FIG. 1.

FIG. 5 is a plan view illustrating the removal of the valve body from the manifold.

FIG. 6 is a side elevational view illustrating the removal of the valve body from the manifold.

FIG. 7 is a perspective view of the spring clamp used in this invention.

Referring now to the drawings, the valve body 10 is shown as secured to the tubular manifold 11 by spring clamp 12. A conventional tapered and rotatable valve plug 13 is mounted within valve body 10 and is secured thereto by spring lock 14. A manually operable handle 16 enables the plug to be turned between off and on position. As is customary, a flexible hose 17 is telescoped onto nipple 18 of the valve body, and leads to the milking apparatus (not shown).

As is seen in FIGS. 1 and 3, the valve body has a concave end surface 19 complementary to the outer surface of manifold 11. A connecting tube member 21 projects outwardly from generally centrally of the concave end surface 19 and fits into the side wall opening 22 of the manifold. The end surface 19 is grooved around the connecting tube to receive the O-ring 23 therein. Although the connecting tube 21 is shown as being formed separately from the valve body, it is to be realized that it may be formed integrally therewith, if desired.

The exterior of the valve body 10 is grooved at 24 to form shoulder surfaces 26 and 27, which face away from the concave end of the valve body. As may be seen, the shoulder surfaces 26 and 27 lie in a common plane perpendicular to the axis of the connecting tube 21, and with one of the shoulder surfaces being on each side thereof.

The spring clamp 12, used to hold the valve body 10 tightly against the manifold, comprises a generally U-shaped member of relatively heavy gauge spring steel, and has one leg 29 thereof bifurcated into two leg portions 31 and 32, which portions can slide into groove 24 to embrace the valve body and which engage the shoulder surfaces 26 and 27, respectively. The other leg 33 of the clamp 12 is curved over the major length thereof complementary to the manifold and extends therearound to engage the manifold generally diametrically opposite to the concave end surface 19 of the valve body. The leg 33 is provided with a lip portion 34 projecting outwardly therefrom. When unstressed, the distance between the clamp legs 29 and 33 is appreciably less than the distance between the manifold wall opposite opening 22 to groove 24.

A clamp removing tool 35, illustrated in FIGS. 5 and 6, has a pair of generally straight and parallel elongated arms 36 and 37 mounted in and extending from handle 38. As is seen in FIG. 5, the arms are spaced apart at the free ends thereof a distance greater than the width of the clamp 12 or the valve body 10. The arms 36 and 37 are provided with hook ends 39 and 40 engageable with the peripheral surface of manifold 11, and a cross member 41 extends between the hook ends, generally at right angles thereto, to engage the under surface of the clamp member lip portion 34.

To connect a valve body 10 to manifold 11, the valve body is manually placed against the manifold with the connecting tube 21 projecting through the manifold opening 28. The clamp 12 is then placed with the leg portions 31 and 32 inserted partially into groove 34 and with the lip portion 34 resting on the top of the manifold. A sharp blow on the top of the clamp, as by fist, mallet or the like, will simultaneously spread the legs of the clamp and will move the clamp downwardly, until the position illustrated in FIG. 2 is reached. The clamp will then hold the valve body tightly against the manifold, with the O-ring 23 being compressed to seal therebetween.

To remove the valve body from the manifold, the clamp removing tool is placed on the manifold, as shown in FIGS. 5 and 6, with the cross member 41 thereof hooked under the clamp lip 34. Since the valve body 10 is constrained against rotation relative to the manifold because of the interengagement of the connecting tube 21 and the manifold opening 22, a downward force applied to the tool handle 38 (as indicated by the arrow in FIG. 6) will pry the clamp upwardly around the manifold 11 and in groove 34. After the clamp has been removed, the valve body 10 is free from the manifold and may be removed therefrom.

As is apparent, the connecting tube 21 serves a double function of preventing relative rotation between the valve body 10 and manifold 11 when the clamp 12 is being applied or removed, and also retains the O-ring in place when the valve body is free of the manifold, thereby avoiding loss of the O-ring.

A guard member 45 is provided to protect the valve body from contamination by dust or insects when the hose 17 is unconnected thereto and comprises a bracket 46 pivotally mounted at 47 to the valve body. The cap 48, carried by the bracket, is biased to the position shown in FIGS. 5 and 6 by the action of the torsion spring 49. The cap is preferably loosely carried by the bracket so that it will seat flush against the valve body nipple 18. As will be noted in FIG. 4, the free end of bracket 46 is concave, as indicated at 50, to facilitate affixing the hose 17 to the nipple 18. When it is so desired, the workman takes the free end of the hose and places it against the concave end 50 of the bracket, and swings the bracket about its pivot point 47. The concavity of the bracket centers the hose end vertically relative to the nipple 18 and the workman then simply pushes the hose onto the nipple. Later, when the hose is disconnected, the spring 49 will automatically return the cap 48 to covering engagement with the nipple 18 to eliminate any danger of contamination.

It is to be realized that the form of the invention herein above and described is to be taken as a preferred embodiment of the same, and that various changes in the shape, size and arrangement of parts may be resorted to without departing from the spirit of the invention or the scope of the attached claims.

Having thus described my invention, what I claim and desire to secure by Letters Patent is:

1. In a milking system, a tubular manifold having a convex outer surface with an opening through said surface, a tubular connector body adapted for connecting a milking hose to said manifold, said body having a substantially unobstructed peripheral portion, a concave end surface complementary to said convex outer surface and a tubular protuberance projecting centrally outward from said concave surface, said tubular protuberance adapted for being matingly fitted through said opening, an annular groove formed in said convex surface around said protuberance and at the base of its projection from said surface, an O-ring disposed in said recess, said connector body containing a groove intermediate said peripheral portion defining a pair of shoulder surfaces facing away from said concave end surface and disposed on diametrically opposite sides of said protuberance, and a generally U-shaped spring clamp having one leg thereof adapted for being removably engaged with said shoulder surfaces, the other leg of said clamp having the major portion curved complementary to said outer manifold surface and adapted for being positioned therearound to engage said surface generally diametrically opposite to said opening therein.

2. In a milking system, a tubular manifold having a convex outer surface with an opening through said surface, a tubular connector body adapted for connecting a milking hose to said manifold, said body having a concave end surface complementary to said convex outer surface and a tubular protuberance projecting centrally outward from said concave surface, said tubular protuberance adapted for being matingly fitted through said opening, an annular groove formed in said convex surface around said protuberance and at the base of its projection from said surface, an O-ring disposed in said recess, said connector body having a pair of shoulder surfaces facing away from said concave end surface and disposed on diametrically opposite sides of said protuberance, and a generally U-shaped spring clamp having one leg thereof bifurcated into two portions and being adapted for being removably engaged with said shoulder surfaces, the other leg of said clamp having the major portion curved complementary to said outer manifold surface and adapted for being positioned therearound to engage said surface generally diametrically opposite to said opening therein.

3. The apparatus of claim 2 wherein said other leg terminates in a flange disposed radially to said manifold in assembled relationship.

References Cited in the file of this patent

UNITED STATES PATENTS

| | | |
|---|---|---|
| 717,042 | Smith | Dec. 30, 1902 |
| 1,116,146 | Smith | Nov. 3, 1914 |
| 1,121,307 | Thebaud | Dec. 15, 1914 |
| 1,178,234 | Hayden | Apr. 4, 1916 |
| 1,239,574 | Dohm | Sept. 11, 1917 |
| 2,688,266 | Knudsen | Sept. 7, 1954 |
| 2,703,721 | Montgomery | Mar. 8, 1955 |
| 2,841,175 | Ford | July 1, 1958 |

FOREIGN PATENTS

| | | |
|---|---|---|
| 472,100 | Canada | Mar. 13, 1951 |
| 520,916 | Belgium | of 1953 |